(12) United States Patent
Yanagimoto et al.

(10) Patent No.: US 6,521,038 B2
(45) Date of Patent: Feb. 18, 2003

(54) NEAR-INFRARED REFLECTING COMPOSITE PIGMENTS

(75) Inventors: Hiromitsu Yanagimoto, Tokyo (JP); Yoshiyuki Zama, Tokyo (JP); Hisao Okamoto, Tokyo (JP); Tohru Hosoda, Tokyo (JP); Yoshio Abe, Tokyo (JP); Michiei Nakamura, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/994,624

(22) Filed: Nov. 28, 2001

(65) Prior Publication Data

US 2002/0129739 A1 Sep. 19, 2002

(30) Foreign Application Priority Data

Dec. 21, 2000 (JP) ......................... 2000-389409

(51) Int. Cl.⁷ ....................... C08L 101/00; C09B 35/10; C09B 35/20; G03G 9/08
(52) U.S. Cl. ....................... 106/493; 106/403; 106/404; 106/410; 106/413; 106/429; 106/447; 106/448; 106/464; 106/471; 106/487; 106/491; 106/494; 106/495; 106/496; 106/497; 106/498; 106/31.6; 106/31.64; 106/31.9; 252/587
(58) Field of Search ................................. 106/410, 413, 106/447, 448, 31.6, 31.64, 31.9, 493, 494, 495, 496, 497, 498, 403, 404, 429, 464, 471, 487, 491; 252/587

(56) References Cited

U.S. PATENT DOCUMENTS

| | | | | | |
|---|---|---|---|---|---|
| 4,486,237 | A | * | 12/1984 | Paffoni et al. | 106/430 |
| 4,523,953 | A | * | 6/1985 | Paffoni et al. | 106/31.8 |
| 4,900,583 | A | * | 2/1990 | Hirabayashi et al. | 427/362 |
| 4,916,014 | A | * | 4/1990 | Weber et al. | 428/403 |
| 5,427,771 | A | * | 6/1995 | Grollier et al. | 424/59 |
| 5,962,143 | A | * | 10/1999 | Krauthauser et al. | 428/425.1 |
| 6,045,609 | A | * | 4/2000 | Guillaumon et al. | 106/401 |
| 6,086,667 | A | * | 7/2000 | Guillaumon et al. | 106/245 |
| 6,235,105 | B1 | * | 5/2001 | Hubbard et al. | 106/403 |
| 6,339,898 | B1 | * | 1/2002 | Toye | 47/9 |
| 6,366,397 | B1 | * | 4/2002 | Genjima et al. | 359/359 |

* cited by examiner

Primary Examiner—Anthony J. Green
(74) Attorney, Agent, or Firm—Oblon, Spivak, McClelland, Maier & Neustadt, P.C.

(57) ABSTRACT

A near-infrared reflecting composite pigment comprises a near-infrared non-absorbing colorant and a white pigment coated with the near-infrared non-absorbing pigment. The near-infrared reflecting composite pigment can be produced by mixing a colorant dispersion, in which the near-infrared non-absorbing colorant is dispersed in a liquid medium, with the white pigment in a form selected from powder or a dispersion and then drying the resultant mixture. A near-infrared reflecting coating agent comprises as a coloring agent the near-infrared reflecting composite pigment. A near-infrared reflecting material comprises a base material coated on a surface thereof with the near-infrared reflecting coating agent.

18 Claims, No Drawings

\# NEAR-INFRARED REFLECTING COMPOSITE PIGMENTS

BACKGROUND OF THE INVENTION a) Field of the Invention

This invention relates to near-infrared reflecting composite pigments (hereinafter simply called "composite pigment") each of which comprises a near-infrared reflecting and/or near-infrared transmitting colorant (which may hereinafter be collectively called "a near-infrared non-absorbing colorant") and a white pigment coated with the near-infrared non-absorbing colorant; their production process; near-infrared reflecting coating agents, such as paints and inks, colored by the composite pigments; and near-infrared reflecting materials coated with the coating agents. The term "near-infrared" as used herein means light of 800 to 2,000 nm in wavelength.

b) Description of the Related Art

Upon coating the roof, outer walls and the like of a building or a like construction, dark-colored paints have heretofore been often used to make stains and the like on the roof, outer walls and the like hardly noticeable. Pigments employed in dark-colored paints generally include carbon black, aniline black, iron oxide black and the like. As these pigments absorb light of wavelengths ranging from the ultraviolet region to the far-infrared region, they absorb heat waves, in other words, near-infrared rays with ease so that rooms or the like of a building or a like construction tend to become hot by direct sunlight.

On the other hand, solar energy reflecting paints containing white pigments such as titanium oxide are known as paints for preventing the temperature of rooms in a building or a like construction from rising. Although these paints have thermal shield effect, they are white or light-colored paints so that stains and the like are readily noticeable. There is, accordingly, an outstanding demand for dark-colored, solar energy reflecting paints.

As dark-colored, solar energy reflecting paints, heat reflecting paints containing inorganic substances such as antimony trioxide and antimony dichromate have been proposed in JP 56-109257 A. These inorganic substances are, however, not preferred from the standpoint of environmental sanitation in that they contains heavy metals.

It has also been proposed that different from the above-described proposal, an outer wall of a building or a like construction is coated with a white paint to form an undercoat and an infrared reflecting or infrared transmitting paint is coated over the undercoat to prevent absorption of direct sunlight and hence to prevent a temperature rise in rooms. This technique, however, involves a problem in that upon performing repair work or the like, repair of the white undercoat (i.e., the coating of the white paint as the undercoat) is also needed.

In recent years, on the other hand, black pigments having properties not available from black pigments commonly used to date, such as carbon black and aniline black, are required in an increasing number of fields owing to developments of lasers, especially semiconductor lasers and sensors therefor. In the field of printing inks, for example, there is an outstanding demand for inks containing infrared reflecting black pigments. These inks make it possible to print information which are not visible to the naked eye but are readable by infrared readers. They can, therefore, be used for printing hidden barcodes or for preventing illegal copying of various printed matters.

SUMMARY OF THE INVENTION

With the foregoing circumstances in view, the present invention has as objects thereof the provision of a composite pigment of a chromatic color or black color, which is usable as a coloring agent in a paint, a printing ink or the like and, especially when employed in the paint, does not absorb near-infrared rays but reflects near-infrared rays without needing a white undercoat and also the provision of its production process.

With a view to achieving the above-described objects, the present inventors have proceeded with various investigations. As a result, it has been found that a composite pigment, which is composed of a near-infrared non-absorbing colorant of a chromatic color or black color and a white pigment coated with the near-infrared non-absorbing colorant, reflects near-infrared rays without absorption and that the room temperature of a building or the like coated with a paint making use of the composite pigment as a colorant is less susceptible to a rise by direct sunlight. Based on this finding, the present invention has been completed.

In one aspect of the present invention, there is thus provided a near-infrared reflecting composite pigment comprising a near-infrared non-absorbing colorant and a white pigment coated with said near-infrared non-absorbing colorant.

In another aspect of the present invention, there is also provided a process for the production of a near-infrared reflecting composite pigment, which comprises mixing a colorant dispersion, in which the above-described colorant is dispersed in a liquid medium, with a white pigment in a form selected from powder or a dispersion and then drying the resultant mixture.

In a further aspect of the present invention, there is also provided a near-infrared reflecting coating agent comprising as a coloring agent the above-described near-infrared reflecting composite pigment.

In a still further aspect of the present invention, there is also provided a near-infrared reflecting material comprising a base material coated on a surface thereof with the above-described near-infrared reflecting coating agent.

In the composite pigment according to the present invention, the white pigment is coated with the near-infrared non-absorbing colorant, for example, the near-infrared non-absorbing colorant is adsorbed in a finely-divided form on the surfaces of particles of the white pigments. Even when the composite pigment is dispersed in a medium, no flooding thus occurs between the white pigment and the near-infrared non-absorbing colorant. Moreover, this dispersion is substantially higher in concentration and more economical compared with a dispersion of the same amount of the near-infrared non-absorbing colorant.

As the composite pigment according to the present invention has an external appearance of a similar color as the near-infrared non-absorbing colorant and contains the white pigment as nuclei, its performance to absorb near-infrared rays is lower than that of near-infrared non-absorbing colorant itself. When employed in a paint or ink, an object coated with the paint or ink is less susceptible to a temperature rise by direct sunlight. The composite pigment according to the present invention, therefore, can show excellent near-infrared screening effect.

The near-infrared reflecting coating material—which is coated with the near-infrared reflecting agent, for example, paint comprising the composite pigment of the present invention—obviates a white undercoat or the like which has theretofore been required, thereby making it possible to exhibit near-infrared screening effect closer to the performance of the paint itself. Further, it is unnecessary to apply a white undercoat upon performing repair work or the like.

A near-infrared reflecting material can also be provided by printing or coating information with a near-infrared reflecting ink which comprises the composite pigment according to the present invention. This information is not visible to the naked eye, but is readable by an infrared reader or the like. Use of this ink makes it possible to provide a printed matter having a hidden barcode or an illegal-copying-preventing printed area.

DETAILED DESCRIPTION OF THE INVENTION AND PREFERRED EMBODIMENTS

Based on certain preferred embodiments, the present invention will hereinafter be described in further detail.

Illustrative of the near-infrared non-absorbing colorant, that is, the near-infrared transmitting or reflecting colorant for use in the present invention can include azo, anthraquinone, phthalocyanine, perinone/perylene, indigo/thioindigo, dioxazine, quinacridone, isoindolinone, isoindoline, diketopyrrolopyrrole, azomethine, and azomethine-azo organic pigments. Preferred black colorants can include azo, azomethine, and perylene organic black colorants. Although the term "colorant" means a "dye" or a "pigment", a "colorant" will hereinafter be referred to as a "pigment" because pigments are preferred in the present invention.

A particularly preferred pigment is a near-infrared transmitting black pigment represented by the following formula (I):

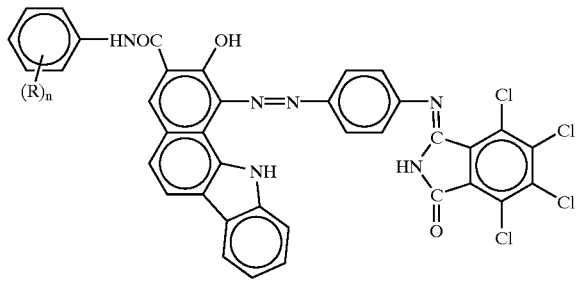

(I)

wherein R represents a group selected from the group consisting of lower alkyl groups having 1 to 3 carbon atoms and lower alkoxy groups having 1 to 3 carbon atoms, n stands for an integer of from 1 to 5, and, when n is at least 2, Rs may be the same or different.

The above-described black pigment can be obtained by coupling a diazonium salt, which has been obtained by diazotizing a 3-(aminophenylimino)-1-oxo-4,5,6,7-tetrachloroisoindoline represented by the below-described formula (II) in a manner known per se in the art, as a diazo component with a 2-hydroxy-11H-benzo[a]-carbazole-3-carboxyarylamide represented by the below-described formula (III) as a coupling component in a manner known per se in the art. One or more coupling components can be used. Further, the diazo component and the coupling component may be used in the same equivalent amounts. As an alternative, one of the diazo component and the coupling component may be used in an excessive or insufficient amount.

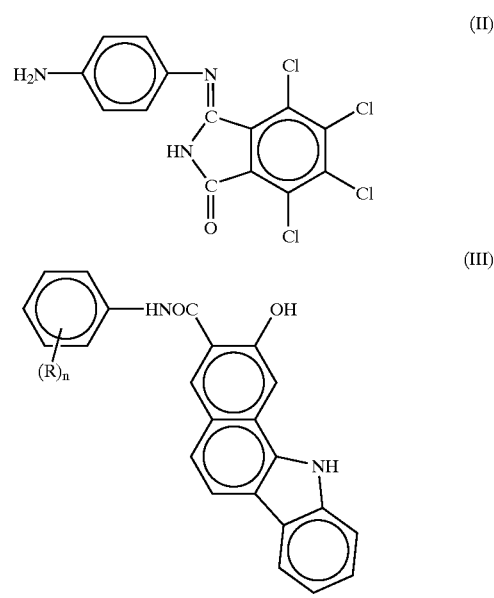

wherein R and n have the same meanings as defined above.

Specific examples of the coupling component can include 2-hydroxy-N-(2'-methyl-4'-methoxyphenyl)-11H-benzo[a]-carbazole-3-carboxamide, 2-hydroxy-N-(4'-methoxyphenyl)-11H-benzo[a]-carbazole-3-carboxamide, and 2-hydroxy-N-(2'-ethylphenyl)-11H-benzo[a]-carbazole-3-carboxamide.

By coupling the above-described diazonium salt as the diazo component with the coupling component in an aqueous medium or an organic solvent medium such as o-dichlorobenzene in a manner known per se in the art, 2-hydroxy-N-phenyl-1-{[[4-(4,5,6,7-tetrachloro-1-oxo-2,3-dihydro-1H-isoindol-3-yliden)amino]phenyl]azo}-11H-benzo[a]-carbazole-3-carboxamide represented by the above-described formula (I), a black azo pigment, was obtained. This black azo pigment has excellent near-infrared transmitting property and also near-infrared reflecting property although the latter property is not so high as the former property.

The white pigment for use in the present invention is white inorganic or organic powder. Examples of the white pigment can include white pigments such as titanium oxide and zinc white; and also, extender pigments such as calcium carbonate, barium sulfate, alumina, silica, clay, activated clay, silicic gel, aluminum powder, stainless steel powder, and organic plastic pigments. These white pigments can be used either singly or in combination. These white pigments are all available on the market and usable in the present invention.

The composite pigment according to the present invention can be produced by mixing a dispersion of a near-infrared non-absorbing colorant with powder or a dispersion of a white pigment and drying the resultant mixture. Preferably, the near-infrared non-absorbing colorant is used as a colorant dispersion with the near-infrared non-absorbing colorant dispersed in a liquid medium by using a dispersant.

Preferred dispersants for use in the present invention upon forming the colorant into a water-based colorant dispersion are hydrophilic high-molecular dispersants containing anionic groups such as carboxyl groups or sulfonic groups, cationic groups such as amino groups or quaternary ammonium groups, nonionic groups such as hydroxyl groups or ether groups, or any of the above-described ionic groups together with nonionic groups. High-molecular dispersants known to date are all usable.

Preferably usable examples can include hydrophilic high-molecular substances, each of which is obtained by using as an essential monomer at least one hydrophilic monomer such as acrylic acid, methacrylic acid, dimethylaminoethyl methacrylate or hydroxyethyl methacrylate and copolymerizing it with styrene or a (meth)acrylate ester, and polyester resins each of which is obtained by reacting an excess amount of a polycarboxylic acid with a polyhydric alcohol.

The content of the hydrophilic monomer in the high-molecular dispersant may range preferably from 5 to 80 wt. %, more preferably from 10 to 40 wt. %. A content higher than 80 wt. % leads to a dispersant having insufficient adsorbability on the colorant, so that the colorant undergoes flocculation or settling. A content lower than 5 wt. %, on the other hand, leads to a dispersant with reduced hydrophilicity, so that the pigment is observed to have a tendency to flocculate or settle in a form included in the dispersant although particles themselves of the colorant do not flocculate or settle.

In the present invention, a practically satisfactory colorant dispersion can be obtained even if the molecular weight of the high-molecular dispersant varies. Nonetheless, an unduly low molecular weight leads to a reduction in the effect as a dispersant, while an excessively high molecular weight results in a dispersion the viscosity of which is so high that a high-concentration colorant dispersion tends to become hardly available. The preferred number average molecular weight of the high-molecular dispersant ranges from 3,000 to 100,000 (as measured by GPC and calibrated against standard polystyrene).

Upon use, the above-described dispersant is generally furnished as a water-soluble salt. When the dispersant contains anionic groups, examples of a salt-forming base can typically include sodium, potassium and ammonia; and can also include, as amines, primary to tertiary aliphatic amines such as mono-, di- and tri-methylamines and mono-, di- and tri-ethylamines; alcoholamines such as mono-, di- and tri-propanolamine, methylethanolamine and dimethylethanolamine; and morpholines such as morpholine and N-methylmorpholine. When the dispersant contains cationic groups, on the other hand, examples of a salt-forming acid can include acetic acid and hydrochloric acid as typical acids.

Upon preparation of the dispersion of the near-infrared non-absorbing colorant in the present invention, various chromatic pigments and additives employed as needed in the present field of technology can be used as desired to extent not detrimental to the advantageous effects of the present invention.

As the chromatic pigments, conventionally-known, organic or inorganic pigments can be used. Illustrative are azo, anthraquinone, phthalocyanine, perinone/perylene, indigo/thioindigo, dioxazine, quinacridone, isoindolinone, isoindoline, diketopyrrolopyrrole, azomethine, azomethine-azo, iron oxide, and composite oxide pigments.

Illustrative of the additives are ultraviolet absorbers, light stabilizers, antioxidants, plasticizers, rust inhibitors, surfactants, metallic soaps, lubricants, and flame retardants.

As the liquid medium which is used to prepare the colorant dispersion in the present invention, water, a mixture of water and a hydrophilic organic solvent, or an organic solvent can be used. Examples Df such organic solvents can include hydrophilic solvents, for example, alcohols such as ethanol, propanol, isopropanol, ethylene glycol, diethylene glycol, triethylene glycol, propylene glycol, dipropylene glycol, glycerin, methyl cellosolve acetate, methyl carbitol, ethyl carbitol, butyl carbitol, propylene glycol monomethyl ether and propylene glycol monomethyl ether acetate, and derivatives thereof; paint and/or ink solvents such as toluene, xylene, methyl ethyl ketone, methyl isobutyl ketone and cyclohexanone; and mixtures thereof.

The dispersion of the near-infrared non-absorbing colorant, which is used in the present invention, is prepared using the above-described components. As its preparation method, any desired one of methods known to date can be adopted, and no particular limitation is imposed thereon. As a typical example, the above-described individual components are combined, and the resultant mixture is mixed and ground in a liquid medium by a conventionally-known disperser such as a horizontal disperser with a tumbling medium contained therein, a vertical disperser with a tumbling medium contained therein, a ball mill, a homomixer, a sand grinder, a speed line mill or a roll mill.

In the colorant dispersion obtained as described above, the content of the near-infrared non-absorbing colorant may preferably be in a range of from 10 to 50 wt. %. If the content of the colorant is too low, the proportion of the near-infrared non-absorbing colorant becomes low (in other words, the content of the liquid medium becomes high) when mixed with the white pigment, and accordingly, the coating of the white pigment with the colorant becomes insufficient. An excessively high content of the colorant, on the other hand, is not preferred because the wettability of the white pigment with the colorant dispersion becomes insufficient. Further, it is preferred to use the dispersant in a range of from about 10 to 100 parts by weight per 100 parts by weight of the colorant.

The composite pigment according to the present invention is obtained by mixing powder or a dispersion of the white pigment with the dispersion of the near-infrared non-absorbing colorant and then drying the resultant mixture. When the white pigment is used as powder, it is preferred to mix the white pigment and the dispersion of the near-infrared non-absorbing colorant in proportions such that the amount of the medium in the resultant mixture falls within a range of from 5 wt. % of the whole mixture to the oil absorption or water absorption of the mixture of the near-infrared non-absorbing colorant and the white colorant. Their mixing can be effected, for example, by mixing them for several seconds to several tens minutes in a high-speed powder blender such as a Henschel mixer. The colorant dispersion may preferably be used in a range of from 5 to 500 parts by weight of the near-infrared non-absorbing colorant per 100 parts by weight of the white pigment on a solid basis, although this range varies depending on the concentration of the colorant in the colorant dispersion.

When the white pigment is used as a dispersion, it is preferred to use the white pigment in the form of a white pigment dispersion with the white pigment dispersed in a liquid medium by using a high-molecular dispersant as in the case of the near-infrared non-absorbing colorant. As the liquid medium, the same solvent as the above-described solvent employed in the case of the near-infrared non-absorbing colorant can be used. The content of the white pigment in the dispersion may preferably be from 20 to 50 wt. % or so, although no particular limitation is imposed thereon. The high-molecular dispersant can be used in a similar proportion as in the case of the near-infrared non-absorbing colorant.

When mixing the white pigment dispersion with the dispersion of the near-infrared non-absorbing colorant, a conventional mixer such as a dissolver can be used, for example. When an ionic high-molecular dispersant is used as a dispersant, the white pigment is coated with the near-infrared non-absorbing colorant by changing the pH of the resulting dispersion or converting the dispersant into a water-insoluble salt with multivalent metal ions. Especially when an anionic high-molecular dispersant is used, addition of an aqueous solution of a salt of aluminum or an alkaline earth metal in a small proportion makes it possible to form anionic groups, which exist on the dispersant, into a salt with cations and hence to render the dispersant insoluble in water, and as a result, the binding force between the white pigment and the near-infrared non-absorbing colorant can be enhanced. When the white pigment is a salt of a multivalent metal such as an alkaline earth metal, the dispersant is rendered water-insoluble on surfaces of the white pigment as the multivalent metal salt to exhibit a similar advantageous effect without needing specifically adding multivalent metal ions as described above.

The composite pigment according to the present invention is obtained by drying the mixture of the powder or dispersion of the white pigment and the dispersion of the near-infrared non-absorbing pigment by a desired drying method. Particularly suited is spray drying, which affords the composite pigment in a powder form.

The composite pigment according to the present invention can be formulated into a near-infrared reflecting paint or ink by mixing it with a paint or ink vehicle. This vehicle is a synthetic or natural resin, oil or solvent or the like, which is commonly used in the production of paints or inks. Vehicles which have been conventionally used in paints or inks are all usable, and no particular limitation is imposed in this respect.

Illustrative of vehicle resins for paints are drying oils, natural resins such as rosin and gilsonite, alkyd resins, amino resins, epoxy resins, unsaturated polyester resins, vinyl resins, acrylic resins, and polyurethane resins, while illustrative of vehicle resins for inks are the above-described natural resins, petroleum resins, phenol resins, alkyd resins, vinyl resins, polyamide resins, acrylic resins, and nitrocellulose. These vehicle resin and composite pigment can be used at a similar ratio as the pigment and vehicle resin in a conventional paint, and no particular limitation is imposed in this respect.

The coating agent according to the present invention, such as a near-infrared reflecting paint or ink, can be obtained from the composite pigment and the above-described vehicle by using a conventionally-known disperser, for example, a horizontal disperser with a tumbling medium contained therein, a vertical disperser with a tumbling medium contained therein, a ball mill, a roll mill, a disperser or the like.

To coat with the near-infrared reflecting paint obtained as described above, a conventionally-known coating method making use of a brush, a roller or an air spray gun, for example, can be applied. No particular limitation is imposed on a base material to be coated. Examples of the base material can include metallic base materials such as aluminum sheets and plates and iron sheets and plates, base materials of plastics such as acrylic resins and polycarbonates; wood; and base materials of inorganic materials such as glass and ceramics.

Illustrative of a printing method making use of the near-infrared reflecting ink obtained as described above are letterpress printing, lithography, intaglio printing, gravure printing, screen printing, electrophotographic printing, ink-jet printing, and heat transfer printing. Illustrative of a coating method making use of the near-infrared reflecting ink obtained as described above are those making use of a blade coater, a rod coater, a knife coater, a squeegee coater, an air doctor coater, a gravure coater, a spray coater, a laser printer, an inkjet printer, a heat transfer printer, and the like.

No particular limitation is imposed on a base material to be coated with the above-described ink. Printable or coatable base materials known to date are usable, for example, paper, chemical fiber mixed paper, synthetic paper, non-woven fabric, woven fabric, plastic films, plastic sheets, plastics, metals, wood, glass, and ceramics.

The present invention will next be described more specifically based on the following Examples, in which the designations of "part" or "parts" or "%" are all on a weight basis unless otherwise specifically indicated.

EXAMPLE 1

A black pigment (2-hydroxy-N-(2'-methyl-4'-methoxyphenyl)-1-{[4-[4(4,5,6,7-tetrachloro-1-oxo-2,3-dihydro-1H-isoindol-3-yliden)amino]phenyl]azo}-11H-benzo[a]-carbazole-3-carboxamide, 200 parts) represented by the formula (I), an aqueous solution (solid content: 40%, 200 parts) of the ammonium salt of a styrene-acrylic acid copolymer and water (400 parts) were subjected to dispersion treatment in a horizontal disperser with a tumbling medium contained therein to obtain a black colorant dispersion.

On the other hand, titanium oxide pigment (200 parts) were thoroughly deflocculated in water (500 parts) by a homomixer. The above-obtained black colorant dispersion (600 parts) was poured into the titanium oxide dispersion, followed by stirring for 1 hour. A dilute solution of acetic acid was then added dropwise to the resultant mixture such that its pH was lowered to about 4 to 5 to coat the titanium oxide pigment with the black pigment. The coated product was collected by filtration, washed with water, dried in hot air, and then ground to afford a composite pigment of the present invention.

EXAMPLE 2

Titanium oxide pigment (500 parts) were placed in a Henschel mixer. While stirring the titanium oxide pigment at a high speed, a black colorant dispersion (600 parts) which had been prepared in a similar manner as in Example 1 was added in the form of a spray over 15 minutes. The resultant mixture was dried in hot air to afford a composite pigment of the present invention.

EXAMPLE 3

A black colorant dispersion was prepared in a similar manner as in Example 1 except that in place of the black pigment in Example 1, C.I. Pigment Blue 15 (blue pigment) (55 parts), C.I. Pigment Red 57 (red pigment) (100 parts) and C.I. Pigment Yellow 17 (yellow pigment) (45 parts) were used. The black colorant dispersion was added to a titanium oxide dispersion in a similar manner as in Example 1 to afford a composite pigment of the present invention.

EXAMPLE 4

A black colorant dispersion was prepared in a similar manner as in Example 1 except that in place of the black pigment in Example 1, C.I. Pigment Black 32 (black pigment) (200 parts) was used. The black colorant dispersion was prepared in a similar manner as in Example 1, and was then added to a titanium oxide dispersion in a similar manner as in Example 1 to afford a composite pigment of the present invention.

EXAMPLES 5–8

Composite pigments in Table 1 were obtained in a similar manner as in Example 1 or 2.

TABLE 1

| Example | Choromatic pigment | White pigment |
|---|---|---|
| 5 | C.I. Pigment Blue 15 | Titanium oxide |
| 6 | C.I. Pigment Red 122 | Zinc oxide |
| 7 | C.I. Pigment Yellow 147 | Alumina |
| 8 | C.I. Pigment Yellow 128 | Titanium oxide |

EXAMPLES 9–12

C.I. Azoic Diazo Components in the following table were separately diazotized, and together with their corresponding C.I. Azoic Coupling Components in the following table, were then subjected to coupling reactions to obtain black pigments, respectively. Using those black pigments, composite pigments were obtained in a similar manner as in Example 1 or Example 2.

TABLE 2

| Example | C.I. Diazo Component (No.) | C.I. Coupling Component (No.) | White pigment |
|---|---|---|---|
| 9 | 48 | 13 | Titanium oxide |
| 10 | 38 | 4 | Barium sulfate |
| 11 | 36 | 25 | Zinc oxide |
| 12 | 43 | 2 | Titanium oxide |

EXAMPLE 13

Using the composite pigment of Example 1, preparation of a paint was conducted with the below-described formula. The composite pigment(3 parts) of Example 1, a base varnish (12 parts), a thinner (6 parts) and glass beads (48 parts) were placed in a 100-mL glass bottle. After shaken for 90 minutes by a paint shaker, the base varnish (39 parts) was added. The resultant mixture was shaken for 10 minutes by the same paint shaker to prepare a thermosetting alkyd paint.

In the above-described formula, the base varnish consisted of 70% of "SUPERBECKAMINE J-820" (tradename, product of Dainippon Ink & Chemicals, Incorporated) and 30% of "PHTHALKYD 133-60" (tradename, product of Hitachi Chemical Company Ltd.), and the thinner consisted of 80% of xylene and 20% of butanol. To a steel plate coated with a carbon black paint, the thermosetting alkyd paint was coated using a bar coater (rod No. 40), followed by hardening at 135° C. for 30 minutes.

EXAMPLES 14–16

Using the composite pigments of Examples 2–4, separately, preparation of paints was conducted with the same formula as in Example 13. To steel plates coated with the carbon black paint, those paints were coated using the bar coater (rod No. 40), followed by hardening at 135° C. for 30 minutes.

Comparative Example 1

Using the same black pigment as in Example 1, a paint was prepared with the same formula as in Example 13. To a steel plate coated with the carbon black paint, the paint was coated using the bar coater (rod No. 40), followed by hardening at 135° C. for 30 minutes.

Comparative Examples 2–3

The same black pigments as those employed in Examples 3–4 were separately dispersed in the base varnish in a similar manner as in Comparative Example 1 to prepare paints. To steel plates coated with the carbon black paint, those paints were coated, respectively, by using the bar coater (rod No. 40), followed by hardening at 135° C. for 30 minutes.

EXAMPLE 17

(Temperature Rise Test)

On heat-insulated, temperature rise test boxes made of 15-mm thick expanded polystyrene plates, the test plates (150×70×1 mm) of Examples 13–16 and Comparative Examples 1–4 were placed, respectively. Each test plate was exposed to light from a 250 W infrared lamp held at a distance of 400 mm above the test plate, and the temperature on the surface of the test plate and that in the box were measured at one minute, five minutes, 10 minutes and 30 minutes after the exposure, respectively.

The test results are shown in Table 3. The test plates of Comparative Examples 1–4, in which the pigments were used in their non-composite forms, were affected by the carbon black paint applied as undercoats, so that the temperature rises in the case of the test plates of Comparative Examples 1–4 were greater in both surface temperature and intra-box temperature than in the case of the test plates of Examples 13–16 in which the composite pigments were used. The differences in the intra-box temperature upon elapsed time of 30 minutes between the test plates of Comparative Examples 1–4 and those of Examples 13–16 were as much as about 10° C. The near-infrared reflecting materials of Examples 13–16—which were coated with the composite-pigment-containing paints, respectively—had excellent near-infrared screening property.

TABLE 3

| | Temperature, ° C. (surface/intra-box) | | | | |
|---|---|---|---|---|---|
| | Start | 1 min later | 5 min later | 10 min later | 30 min later |
| Ex. 13 | 25/24 | 49/30 | 61/40 | 64/47 | 67/55 |
| Comp. Ex. 1 | 25/24 | 63/30 | 75/43 | 78/51 | 81/63 |
| Ex. 14 | 25/24 | 51/30 | 63/41 | 66/48 | 69/57 |
| Ex. 15 | 25/25 | 51/32 | 64/44 | 69/50 | 72/62 |
| Comp. Ex. 2 | 25/25 | 65/32 | 79/49 | 84/55 | 85/68 |
| Ex. 16 | 25/24 | 50/31 | 62/42 | 66/48 | 69/59 |
| Comp. Ex. 3 | 25/24 | 65/32 | 77/45 | 80/52 | 82/66 |

EXAMPLE 18

An offset lithographic black ink was prepared from the composite pigment of Example 1 (30 parts), an oil varnish for offset lithographic inks (61.7 parts), drier (0.8 part) and an ink solvent (7.5 parts). Using the offset lithographic black ink, a sheet of white art paper was printed solid at a screen tint of 100% with 150 screen ruling by an offset press.

The oil varnish for offset lithographic inks contained, as primary components, a rosin-modified phenol resin, a drying-oil-modified isophthalic acid alkyd and a drying oil and as additives, an ink solvent and an aluminum chelate.

EXAMPLE 19

Using the black ink of Example 18, a sheet of black art paper was printed solid instead of the white art paper in Example 18.

EXAMPLE 20

Using the composite pigment of Example 9, an offset lithographic black ink was prepared in a similar manner as in Example 18. A sheet of white art paper was subjected to offset printing with the offset lithographic black ink.

EXAMPLE 21

Using the black ink of Example 20, a sheet of black art paper was printed solid instead of the white art paper in Example 20.

Comparative Examples 4–7

Two types of offset lithographic black inks were prepared from the non-composite black pigments used in Examples 1 and 9 (23 parts), the oil varnish for offset lithographic inks (71.2 parts), the drier (0.8 part) and the ink solvent (5parts). In a similar manner as in Example 18, sheets of white art paper were subjected to offset printing with the offset lithographic black inks, respectively.

Comparative Examples 6–7

Using the two types of black inks of Comparative Examples 4–5, sheets of black art paper were printed solid, respectively, instead of the white art paper in Comparative Examples 4–5.

EXAMPLE 22

To determine properties of the printed matters of Examples 18–21 and Comparative Examples 4–7 to visible light and infrared rays, the reflectances of the printed matters over the ultraviolet range—the visible range—the near-infrared range were measured by "Model 330 Automatic Spectrophotometer" (tradename, manufactured by Hitachi, Ltd.) while keeping alumina white coated plates in close contact with the back sides of the printed matters. The results are shown in Table 4.

TABLE 4

| | Reflectance (%) | | | | | | | | | |
| --- | --- | --- | --- | --- | --- | --- | --- | --- | --- | --- |
| | Wavelength (nm) | | | | | | | | | |
| | 300 | 400 | 500 | 600 | 700 | 800 | 900 | 1000 | 1100 | 1200 |
| Example 18 | 6 | 7 | 6 | 5 | 10 | 88 | 89 | 90 | 92 | 90 |
| Comparative Example 4 | 3 | 4 | 3 | 3 | 10 | 93 | 94 | 95 | 95 | 93 |
| Example 19 | 6 | 7 | 6 | 5 | 10 | 80 | 80 | 82 | 83 | 82 |
| Comparative Example 5 | 3 | 4 | 3 | 3 | 11 | 90 | 91 | 92 | 92 | 91 |
| Example 20 | 7 | 8 | 7 | 6 | 11 | 85 | 86 | 87 | 88 | 86 |
| Comparative Example 6 | 3 | 4 | 3 | 3 | 5 | 40 | 35 | 31 | 25 | 20 |
| Example 21 | 7 | 8 | 7 | 6 | 12 | 78 | 79 | 81 | 80 | 80 |
| Comparative Example 7 | 3 | 4 | 3 | 3 | 6 | 39 | 32 | 25 | 20 | 20 |

From the results of Table 4, the following observations were obtained. The printed matters of Examples 18–21 in which the composite pigments of the present invention were used showed practically no reflection and absorbed light in the ultraviolet range and the visible range, so that they obviously exhibited black colors. In the near-infrared range, however, they showed reflection. Especially in Examples 18 and 20 and Comparative Examples 4 and 5 in which the sheets of white art paper were printed, the reflectances were high because of influence by the white color of the base material. In Examples 19 and 21 in which the sheets of black art paper were printed, on the other hand, reflectances as high as about 80% were shown in the near-infrared range because the composite pigments centrally contained the titanium oxide pigment as nuclei.

The printed matters of Comparative Examples 6 and 7, in which the non-composite black pigments were used, had reflectances as low as about 40% in the near-infrared range, because reflected near-infrared light was absorbed by the black color of the base materials. From the foregoing, it is understood that, when observed by the naked eye, the printed matters of Examples 18–21 and Comparative Examples 4–7 all show a black color and are not distinguishable from each other but, when exposed to near-infrared rays, show differences in reflectance. Near-infrared reflecting inks of the present invention can be applied to the printing of hidden barcodes or to printing intended for the prevention of illegal copying by using them in combination with a conventional black ink, such as a carbon black ink, and a base material of a white color, a black color or the like and determining differences in their properties to near-infrared rays by an infrared reader.

What is claimed is:

1. A near-infrared reflecting composite pigment comprising a white pigment coated with a near-infrared non-absorbing colorant.

2. A near-infrared reflecting composite pigment according to claim 1, wherein said near-infrared non-absorbing colorant is at least one organic pigment selected from the group consisting of azo, anthraquinone, phthalocyanine, perinone/perylene, indigo/thioindigo, dioxazine, quinacridone, isoindolinone, isoindoline, diketopyrrolopyrrole, azomethine, and azomethine-azo organic pigments.

3. A near-infrared reflecting composite pigment according to claim 1, wherein said near-infrared non-absorbing colorant is at least one organic black pigment selected from the group consisting of azo, azomethine-azo and perylene organic black pigments.

4. A near-infrared reflecting composite pigment according to claim 1, wherein said near-infrared non-absorbing colorant is a black pigment represented by the following formula (I):

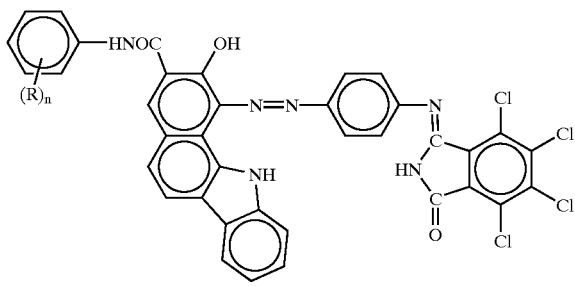

(I)

wherein R represents a group selected from the group consisting of lower alkyl groups having 1 to 3 carbon atoms and lower alkoxy groups having 1 to 3 carbon atoms, n stands for an integer of from 1 to 5, and, when n is at least 2, Rs may be the same or different.

5. The near-infrared reflecting composite pigment of claim 1, wherein the white pigment is a powder selected from the group consisting of at least one of titanium oxide, zinc white, calcium carbonate, barium sulfate, alumina, silica, clay, activated clay, silicic gel, aluminum, stainless steel, and organic plastic pigments.

6. A near-infrared reflecting coating agent comprising as a coloring agent a near-infrared reflecting composite pigment as defined in any one of claims 1–4.

7. A near-infrared reflecting coating agent according to claim 6, which is selected from a paint or an ink.

8. A near-infrared reflecting material comprising a base material coated on a surface thereof with the near-infrared reflecting coating agent of claim 6.

9. A paint comprising the near-infrared composite pigment of claim 1.

10. An ink comprising the near-infrared composite pigment of claim 1.

11. A process for preparing the near-infrared reflecting composite pigment of any one of claims 2–4, which comprises mixing a dispersion of a near-infrared non-absorbing colorant in a liquid medium, with a white pigment in a form selected from a powder or a dispersion and then drying the resultant mixture.

12. The process according to claim 11, wherein said colorant dispersion additionally comprises a high-molecular weight dispersant.

13. The process according to claim 12, wherein said high-molecular weight dispersant is a polymer selected from the group consisting of polymers containing anionic groups, polymers containing cationic groups, polymers containing non-ionic groups, polymers containing anionic and nonionic groups, and polymers containing cationic and nonionic groups.

14. The process of claim 12, wherein said high-molecular weight dispersant has a number average molecular weight of from 3,000 to 100,000.

15. The process of claim 12, wherein the high-molecular weight dispersant is prepared by copolymerizing at least one hydrophilic monomer selected from the group consisting of acrylic acid, methacrylic acid, dimethylaminoethyl methacrylate with at least one monomer selected from the group consisting of styrene, a (meth)acrylic ester, and polyester resins prepared by reacting an excess of polycarboxylic acid with a polyhydric alcohol.

16. The process of claim 15, wherein the amount of hydrophilic monomer in the high-molecular weight dispersant is from 5 to, 80 wt %.

17. The process of claim 12, wherein the high-molecular weight dispersant is a water-soluble salt.

18. The process of claim 11, wherein the liquid medium is at least one selected from the group consisting of water, a hydrophilic organic solvent, an alcohol, ethanol, propanol, isopropanol, ethylene glycol, diethylene glycol, triethylene glycol, propylene glycol, dipropylene glycol, glycerin, methyl cellosolve acetate, methyl carbitol, ethyl carbitol, butyl carbitol, propylene glycol monomethyl ether, propylene glycol monomethyl ether, toluene, xylene, methyl ethyl ketone, methyl isobutyl ketone, and cyclohexanone.

* * * * *